United States Patent
Schiesser et al.

(10) Patent No.: US 6,367,617 B1
(45) Date of Patent: Apr. 9, 2002

(54) AXLE HOLDING YOKE FOR CONVEYOR ROLLER

(75) Inventors: Ricardo N. Schiesser, Rockford; Curtis E. LeMay, Shelbyville, both of MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 09/418,297

(22) Filed: Oct. 14, 1999

(51) Int. Cl.[7] .......................... B65G 47/10; B65G 47/46
(52) U.S. Cl. .................. 198/782; 198/785; 198/370.04
(58) Field of Search ................................ 198/782, 785, 198/370.04; 193/35 SS, 35 J, 35 C

(56) References Cited

U.S. PATENT DOCUMENTS

| | | | |
|---|---|---|---|
| 2,828,852 A | * 4/1958 | Lorig | 198/782 X |
| 3,255,865 A | 6/1966 | Sullivan | |
| 3,416,638 A | 12/1968 | Buck | |
| 3,763,992 A | * 10/1973 | Klenk | 193/35 SS X |
| 4,096,942 A | 6/1978 | Shepherd | 198/781 |
| 4,241,825 A | 12/1980 | Brouwer | 198/782 |
| 4,278,166 A | 7/1981 | Pirro, Jr. | 198/781 |
| 4,311,226 A | 1/1982 | Thompson et al. | 193/35 R |
| 4,787,504 A | * 11/1988 | Schultz | 198/782 X |
| 4,832,184 A | 5/1989 | DeGood | 198/781 |
| 4,872,246 A | 10/1989 | Yano | 29/116.1 |
| 4,887,707 A | 12/1989 | Harms | 198/781 |
| 4,905,817 A | * 3/1990 | Limbach et al. | 198/782 X |
| 5,127,513 A | * 7/1992 | Huber | 198/782 X |
| 5,582,286 A | 12/1996 | Kalm et al. | 198/781.06 |
| 5,657,854 A | 8/1997 | Chen et al. | 198/787 |
| 5,875,878 A | 3/1999 | Pierson | 193/37 |
| 5,921,370 A | * 7/1999 | Plesh, Sr. | 193/35 R X |
| 5,964,338 A | 10/1999 | Schroader | 198/782 |

FOREIGN PATENT DOCUMENTS

| | | | |
|---|---|---|---|
| EP | 423415 A1 | 4/1991 | B65G/39/09 |
| GB | 827002 | 1/1960 | 75/65 |
| GB | 843117 | 8/1960 | 78/65 |

* cited by examiner

*Primary Examiner*—Christopher P. Ellis
*Assistant Examiner*—Gene O. Crawford
(74) *Attorney, Agent, or Firm*—Van Dyke, Gardner, Linn & Burkhart, LLP

(57) ABSTRACT

A shaft support for supporting a shaft end of a conveyor roller is pivotable about an axis extending generally along the direction of conveyance of a conveyor, such that the support may pivot to accommodate a change in vertical positioning of one or both ends of the roller. The shaft support may also be pivotable about a generally vertical axis in order to also accommodate skewed rollers mounted at an angle not perpendicular to the direction of conveyance. Because the shaft support is pivotable about the axis extending in the direction of conveyance, the shaft support simplifies the installation and removal of the motorized roller, while providing for a roller does not require a spring loaded shaft or axle. The roller may thus be a low cost roller which may be easily installed and removed from the conveyor.

72 Claims, 6 Drawing Sheets

AXLE HOLDING YOKE FOR CONVEYOR ROLLER

BACKGROUND OF THE INVENTION

The present invention relates generally to conveyor rollers for conveying products along a conveyor and, more particularly, to a mounting structure for rotatably mounting the rollers to the sidewalls of the conveyor. Although the invention is especially adapted for mounting motorized rollers, it may be used with rollers that are slaved to motorized rollers and to rollers driven from beneath such as by a belt or padded chain or the like. The invention may also be used with non-driven rollers.

Typically, conveyor rollers are mounted along opposite sidewalls of a conveyor. The rollers include shafts which extend longitudinally outwardly from each end of the roller and which are received by the sidewalls of the conveyor. These shafts are often non-circular, such as hexagonal shaped, such that rotation of the shafts relative to the sidewalls is substantially precluded when the shaft is received by a correspondingly shaped slot or hole in the sidewall.

Motorized rollers are typically implemented with a set of non-driven or slave rollers and may be interconnected with the slave rollers by a plurality of bands, such that rotation of the motorized roller causes a corresponding rotation of the slave rollers. The motorized rollers include a motor within the cylindrical portion of the roller, which causes relative rotation between the shaft portions and the cylindrical portion of the roller. Accordingly, when the shafts are secured to the sidewall of the conveyor, actuation of the motor within the roller causes the cylindrical portion of the roller to rotate. Because of the torque generated when the motorized roller is actuated, the shaft, submitted to the same torque, tends to rotate in the opposite direction from the roller, such that the sides of the non-circular shaft repeatedly impact the sides of the corresponding slot in the sidewall, thereby preventing rotation of the shaft. This repeated impact and relative movement may cause the edges of the shaft or of the hole or both to become worn or rounded over time, which leads to a looser fit of the shaft within the opening. Any looseness between the shaft and opening further results in squeaks or other noises and/or vibrations of the conveyor when it is operated. This eventually may result in greater maintenance costs and even loss of function, since the roller and/or the entire sidewall may have to be replaced when the wear and tear to the shaft and/or the opening in the sidewalls becomes excessive.

Because of the torque generated by the motorized rollers, it is generally preferred that the shafts be inserted through openings and not placed into slots whereby only a portion of the sidewall would contact and restrain the shafts. Therefore, in order to mount the rollers into the openings, the shafts may be spring loaded, such that the shaft may be pushed longitudinally inwardly into the roller to align the roller shaft with the openings and then released to allow the shaft to extend outwardly through the opening, thereby securing the shaft to the conveyor walls. While this may, at least initially, provide a mounting structure which substantially precludes rotation of the shaft, the spring loaded shafts are difficult to install and are costly additions to the rollers, since they require additional moving parts within the roller.

In order to improve upon the wear and tear and noise of the systems, one proposed device has implemented a tapered end to the shafts of the roller. When the tapered shafts are released, the spring loading of the shafts maintains a tight fit in the opening, since the opening is of a smaller size than the largest diameter of the tapered portion of the shaft. While this at least initially provides for a tighter fit between the roller shaft and the opening in the sidewall of the conveyor, over time the shaft and/or opening may wear and allow the shaft to extend further into the opening. The shaft may eventually extend outwardly to a point where the spring is no longer in compression, such that the shaft is no longer held tight to the opening in the sidewall. Therefore, while this device may delay a loose fit of the shaft within the openings, this does not avoid the requirement of eventually having to replace or repair the sidewalls of the conveyor and/or the roller as they become worn. Additionally, the proposed device still requires the spring loading of the shafts in the roller in order to properly mount the rollers to the conveyor.

Additional issues with most known mounting schemes is that they include fixed openings in the sidewalls of the conveyor. If a roller is to be mounted at an angle or skewed relative to the sidewalls of the conveyor, special openings must be cut or formed to accommodate such a mounting orientation. Similarly, special mounting openings are required if the roller is a tapered roller, where the shaft at the wider end of the roller must be mounted at a level below the opposite end, in order to maintain a substantially level conveying surface. Accordingly, if the conveyor is to be modified to implement skewed or tapered rollers, the sidewalls would have to be modified to accommodate such a mounting orientation or replaced with new sidewalls with the appropriate mounting locations. Forming additional holes through the sidewalls may weaken the structural rigidity of the walls, which may further shorten the life of the sidewalls. Also, replacing or modifying the sidewalls may add significant costs to the conveyor.

In order to avoid replacement of the entire sidewall of the conveyor each time the roller orientation may be modified, brackets have been proposed which are formed at angles, such that they may be installed to the sidewalls of the conveyor and provide a proper orientation for receiving the shafts of the skewed rollers therethrough. However, such brackets still require the axles of the rollers to be spring loaded and require replacement of the brackets whenever the orientation of the rollers is to be changed. Accordingly, multiple brackets are required and must be formed to a specific angle and properly installed at the appropriate location in order to mount the roller at the proper skew angle.

An additional proposed device provides a bearing block, which receives the shaft of the rollers and is pivotable about a vertical pivot axis, in order to be adjustable for receiving skewed rollers of varying degrees. However, such a mounting device still requires the shafts of the rollers to be spring loaded and is not adaptable for receiving tapered rollers without modifying the block and the sidewalls. Furthermore, the installation and removal of the shaft within the bearing blocks requires tightening and loosening a cap member such that the aperture through the bearing block may be tightened around the shaft of the roller or loosened for removal of the roller therefrom.

Therefore, there is a need in the art for an adjustable mounting structure for receiving and substantially securing the shaft ends of conveyor rollers, especially motorized conveyor rollers.

SUMMARY OF THE INVENTION

The present invention is intended to provide a mounting structure for receiving the shaft ends of a conveyor roller and pivotally mounting the roller to the sidewalls of a conveyor assembly. This is accomplished in a manner that allows an individual roller to be easily removed in order to, for example, replace the O-rings. Furthermore, the necessity for long brackets that must be separately positioned to the conveyor frame is avoided. Preferably, the shaft receiver or mounting structure is easily adaptable for use with skewed rollers and with tapered rollers, and further facilitates easy installation and removal of the rollers.

According to an aspect of the present invention, a roller shaft support secures a shaft end of a conveyor roller which extends laterally across a conveyor having opposite sidewalls extending generally along a direction of conveyance. The shaft support is interconnectable to the sidewalls of the conveyor such that the shaft support is pivotable about a first axis which extends generally along the direction of conveyance. Preferably, the shaft support is further pivotable about a second axis which extends generally perpendicular or normal to the direction of conveyance. Preferably, the conveyor roller is a motorized roller and the shaft support substantially precludes rotation of the shaft.

In one form, the shaft support comprises a mounting yoke and a receiving block, where the receiving block is pivotally mounted to the mounting yoke and the mounting yoke is pivotally mountable to the sidewalls of the conveyor. The receiving block is pivotable about the second axis and the mounting yoke is pivotable about the first axis.

According to another aspect of the present invention, a powered roller conveyor comprises a pair of opposite sidewalls, at least one motorized roller and at least one shaft support. The motorized roller comprises a shaft portion extending longitudinally outwardly from each end, a generally cylindrical roller surface, and a motor for rotating the roller surface relative to the shaft portions. The shaft support is adaptable to adjustably and pivotally mount at least one of the shaft portions to a sidewall of the conveyor. The shaft support substantially precludes rotation of the roller's shaft portion relative to the shaft support. The shaft support is pivotable relative to the sidewall about a first axis which extends generally along the direction of conveyance of the conveyor. Preferably, the shaft receiver is pivotally interconnectable with the sidewalls about a second axis which is generally normal to the direction of conveyance.

In one form, the motorized roller is a tapered roller and the shaft receiver is adjustably mounted to receive the shaft portion at an appropriate angle. In another form, the motorized roller is mountable to the conveyor such that the roller is skewed with respect to the direction of conveyance. The shaft receiver at each end of the motorized roller is adjustably and pivotably mounted along the sidewalls such that the shaft receivers are spaced along the sidewalls and pivotable to receive the shaft portions at the appropriate angles.

These and other objects, advantages, purposes and features of this invention will become apparent upon review of the following specification in conjunction with the drawings.

DESCRIPTION OF THE PREFERRED EMBODIMENTS

Figure 1:
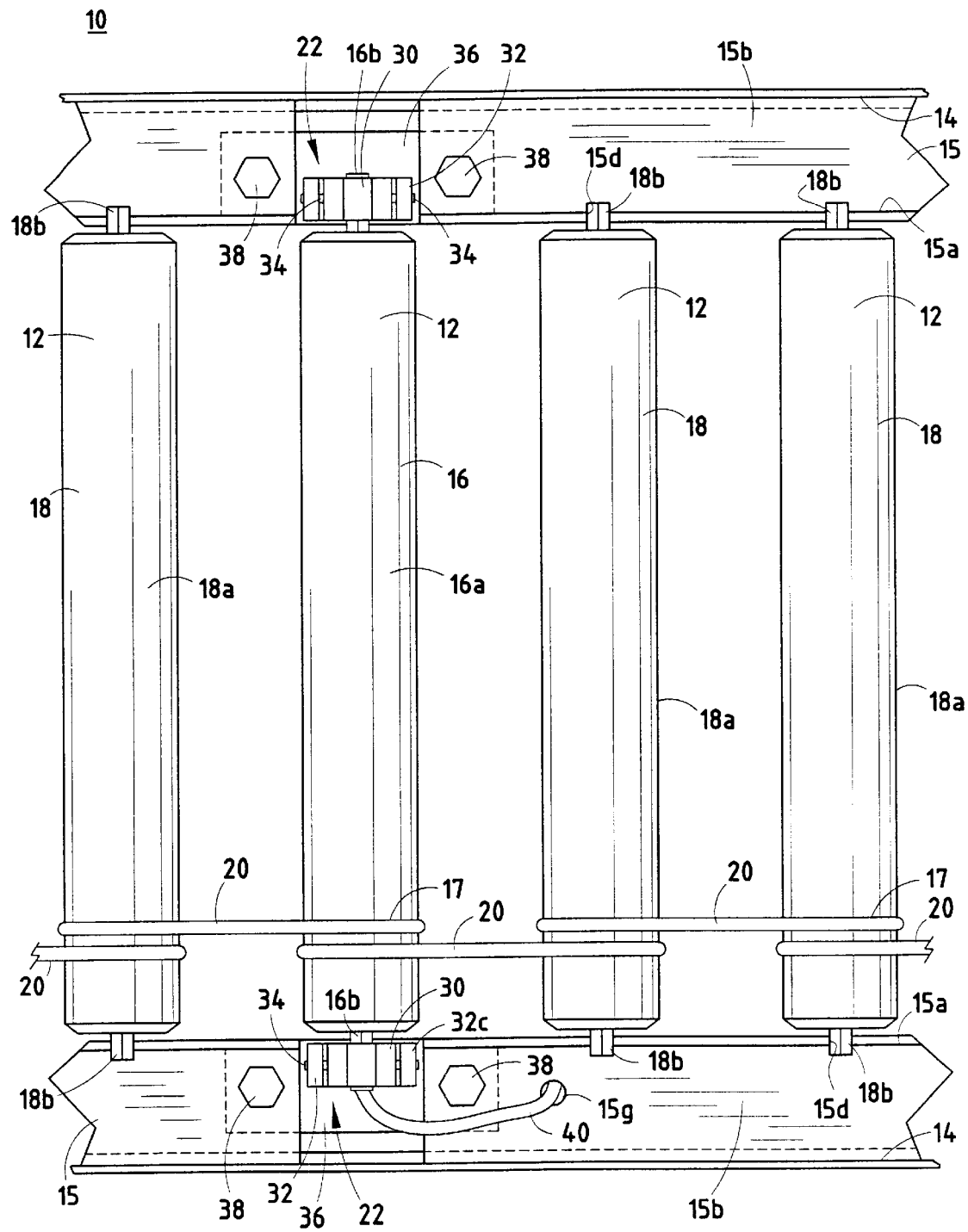
FIG. 1 is a top plan view of a section of a roller conveyor assembly.

Referring now specifically to the drawings, and the illustrative embodiments depicted therein, a roller conveyor 10 comprises a plurality of generally cylindrical rollers 12 rotatably mounted between a pair of substantially parallel opposite sidewalls 14, as shown in FIG. 1. In the embodiment illustrated in FIG. 1, conveyor 10 is divided into separate sections, such that at least one roller within each section is a driven roller 16 positioned among a group of non-driven or slave rollers 18. Driven roller 16 may be interconnected to the slave rollers by a plurality of bands or belts 20, such that rotation of the driven roller 16 causes a corresponding rotation of the slave rollers 18. A control (not shown) functions to rotate driven roller 16 to convey articles along conveyor 10, as is known in the art.

Each roller 16 and 18 comprises a substantially cylindrical portion 16a and 18a and a shaft portion 16b and 18b extending longitudinally outwardly at each end of the cylindrical portion 16a and 18a. The cylindrical portions 16a and 18a may include a pair of grooves 17, such that each band 20 rests within corresponding grooves of adjacent pairs of rollers as shown in FIG. 1. Driven roller 16 may be a motorized roller which functions to rotate cylindrical portion 16a relative to shaft portion 16b of driven roller 16, as is known in the art. Accordingly, when shaft portions 16b are substantially fixed or non-rotatable, actuation of the motorized roller 16 causes rotation of cylindrical portion 16a which subsequently causes rotation of the slave rollers 18 via bands 20 to convey product along the conveyor 10. However, driven roller 16 may be driven and may correspondingly drive the other roller by any known means, without affecting the scope of the present invention. Generally, shaft portions 16b and 18b are formed in a non-circular shape, such that insertion of the shaft portions into a correspondingly shaped slot or aperture in sidewalls 14 or shaft support 22 substantially precludes relative rotation therebetween. Preferably, as shown in FIGS. 2, 3, 4 and 5, the shaft portions and corresponding apertures are hexagonal shaped, although other shapes or locking means, such as set screws or pins, may be implemented without affecting the scope of the present invention.

Figure 2:
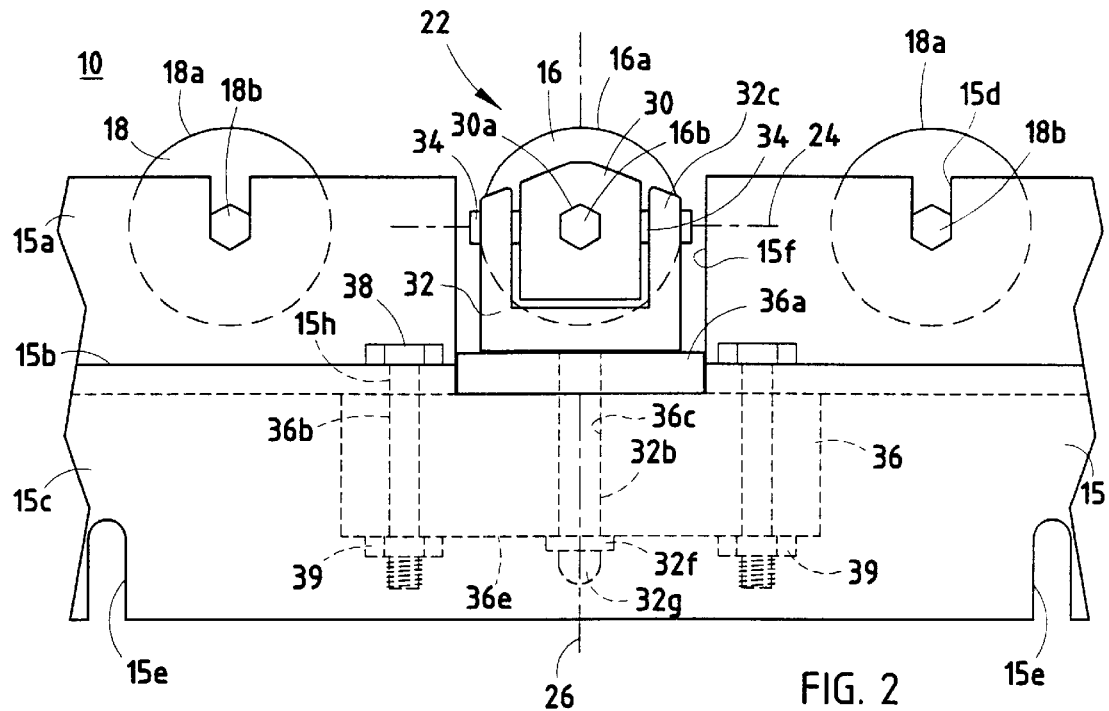
FIG. 2 is an enlarged side elevation of the section of the roller conveyor assembly of FIG. 1.
Figure 3:
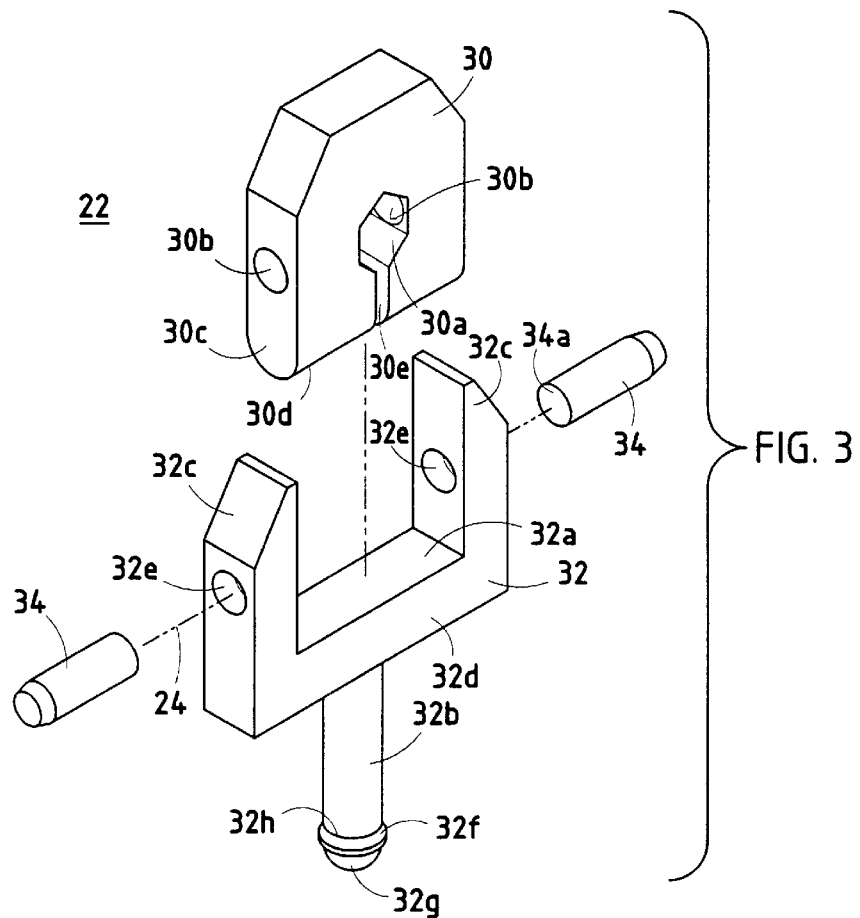
FIG. 3 is an exploded view of a shaft support in accordance with the present invention.
Figure 4:
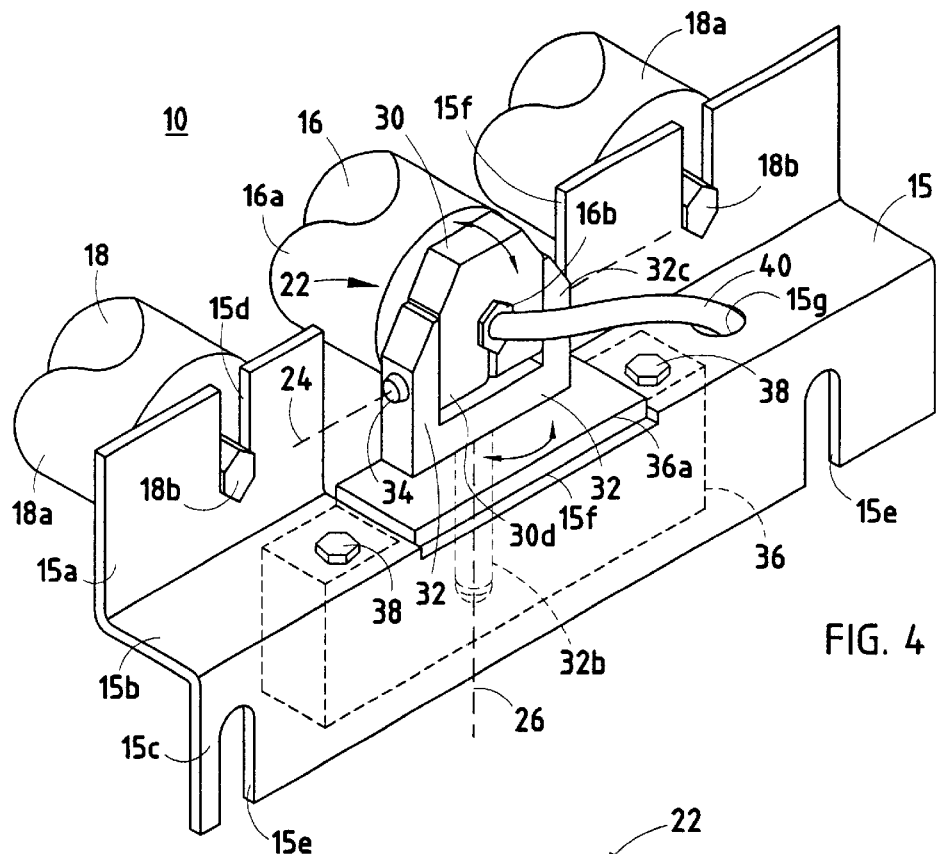
FIG. 4 is a perspective view of the section of the roller conveyor of FIG. 2.
Figure 8:
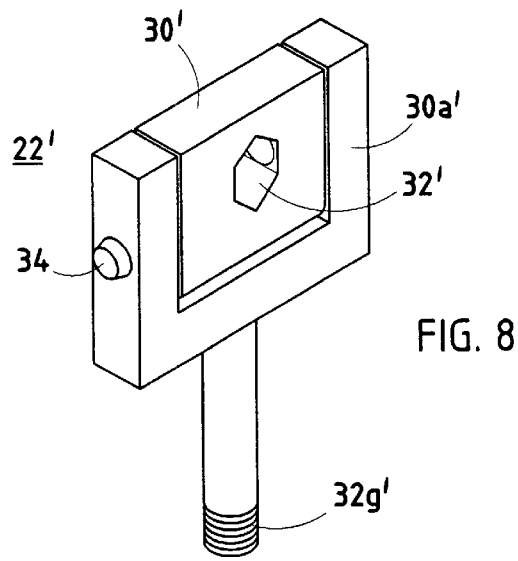
FIG. 8 is an alternate embodiment of the shaft support in accordance with the present invention.

Preferably, the shaft end 16b of driven roller 16 is received by a shaft receiver or support 22. Shaft support 22 is preferably pivotable about two axes, such that it may pivot about an axis 24 extending generally parallel to the direction of conveyance of conveyor 10, and further about an axis 26 which is generally perpendicular or normal to the direction of conveyance of conveyor 10 (FIGS. 2 and 4). Preferably, shaft support 22 is pivotally mounted onto a mounting block 36 which is fixedly secured to a portion of sidewall 14. As shown in FIG. 3, shaft support 22 comprises a yoke 32 and a receiving block 30 pivotally mounted to yoke 32 by a pair of pivot pins 34. Receiving block 30 is preferably generally square shaped with an aperture 30a formed therethrough for receiving shaft portion 16b of roller 16. Aperture 30a is preferably formed in a shape corresponding to the shape of the particular shaft to be received therein. As shown in FIG. 3, aperture 30a may be hexagonal shaped, but may be other shapes corresponding to other shafts, without affecting the scope of the present invention. Receiving block 30 is shown with a slot 30e extending downwardly from shaft aperture 30a which corresponds to a solid wall extending from the outer surfaces of the mold to an inner portion which forms shaft aperture 30a. Receiving block 30 further includes a pair of side apertures or passageways 30b formed at least partially through sidewalls 30c of receiving block 30. Side apertures 30b receive pivot pins 34 to allow receiving block 30 to pivot relative to yoke 32 when shaft support 22 is assembled. A lower portion 30d of receiving block 30 is preferably rounded to facilitate pivoting of block 30 by avoiding interference with yoke 32. Preferably, receiving block 30 is molded from a strong, durable plastic material to resist corrosion. However, receiver block 30 may be formed from brass, steel, aluminum or other materials which resist wear and corrosion and the like and may be formed without the slot 30e, as shown in FIGS. 2 and 8.

Yoke 32 preferably has a generally U-shaped receiving portion 32a and a preferably cylindrical mounting extension 32b which extends downwardly from a base 32d of receiving portion 32a. Receiving portion 32a is defined by a pair of arms 32c which extend upwardly from base 32d. Each arm 32c has a passageway 32e formed therethrough for insertion of pivot pins 34. The generally U-shaped receiving portion 32a is formed to generally correspond to the shape of receiving block 30, such that receiving block 30 fits between arms 32c and has clearance from arms 32c and base portion 32d to allow for pivoting of receiving block 30 about pivot pins 34. Preferably, yoke 32 is formed from a steel material, or other durable material which resists wear, corrosion and the like. However, yoke 32 may be formed from other materials, without affecting the scope of the present invention.

Preferably, mounting extension 32b of yoke 32 is cylindrical and may include a lock ring 32f or other locking means at a lower end 32g of mounting extension 32b. The lock ring 32f functions to secure mounting extension 32b into the wall 14, bracket 15, mounting block 36, or any other mounting structure along walls 14 of conveyor 10, such that shaft receiver 22 cannot be unintentionally removed from its mounting opening. Preferably, locking ring 32f is molded of a rubber material, and rests partially within an indentation or groove 32h formed in mounting extension 32b toward lower end 32g thereof. Although the locking means is preferably a plastic or rubber O-ring 32f, as shown in FIG. 3, the locking means may be other structures or devices, such as a snap fit or slotted end of mounting extension 32b, to secure the mounting extension in its corresponding mounting opening, without affecting the scope of the present invention.

Pivot pins are preferably smooth and are generally cylindrical so that they may be inserted through apertures 32e in arms 32c of yoke 32 and protrude further through and at least partially into apertures 30b of receiving block 30. Preferably, apertures 30b of receiving block 30 are formed to tightly receive the ends 34a of cylindrical pins 34, while pins 34 fit loosely through apertures 32e of yoke 32, such that pins 34 are press fit into receiving block 30 and may rotate within apertures 32e to allow receiving block 30 to pivot relative to yoke 32. Alternately, however, pins 34 may be tightly positioned in apertures 32e of yoke 32 and loosely inserted through openings 30b of receiving block 30 to allow receiving block 30 to pivot about pins 34 within yoke 32. Clearly, however, other means of allowing relative rotation of receiving block 30 to yoke 32 may be implemented without affecting the scope of the present invention. For example, pins 34 may be threaded and either receiving block 30 or yoke 32 may be correspondingly threaded to secure the pins in one of the components while allowing rotation of the pins relative to the other component. Alternately, a pair of spherical bearings may rest within corresponding indentations or openings in receiving block 30 and yoke 32, such that the receiving block is pivotable about the bearings. Therefore, as assembled, receiving block 30 is pivotally secured between arms 32c of yoke 32 by pins 34 and may then pivot about pivot axis 24 defined by pins 34.

Figure 5:
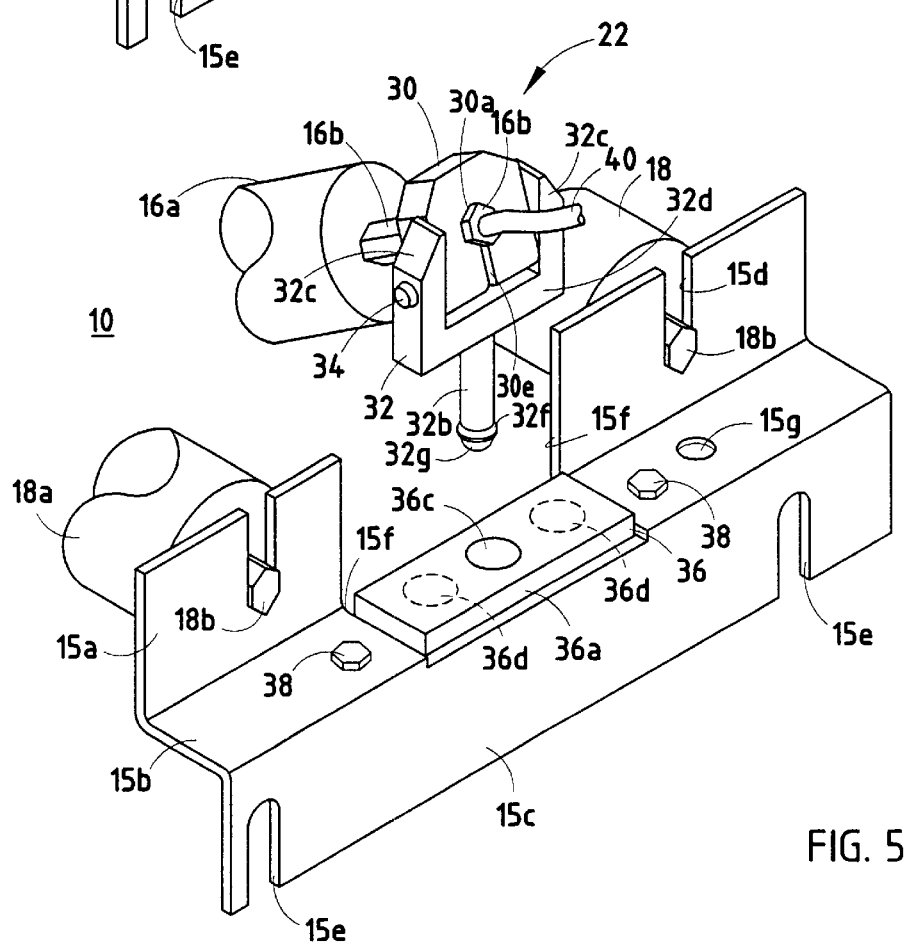
FIG. 5 is the same perspective view of FIG. 4, showing the installation or removal of the roller and shaft support to or from a side bracket of the roller conveyor assembly.

Preferably, shaft support 22 is pivotally mounted to a mounting block 36, which is substantially secured to a sidewall bracket 15. As best shown in FIGS. 4 and 5, sidewall bracket 15 is preferably a generally Z-shaped bracket having an upwardly extending portion 15a for receiving shaft ends 18b of slave rollers 18, a substantially horizontal portion 15b, and a downward extending portion 15c for securing the Z-shaped bracket 15 to sidewalls 14 of conveyor 10. Upper portion 15a has a plurality of slots 15d formed along an upper edge for receiving shaft end 18b of each of the slave rollers 18, as is known in the art. Lower portion 15c of bracket 15 may then be fixedly secured to sidewalls 14 by a plurality of bolts (not shown) extending through slots 15e in lower portion 15c and further into corresponding openings (not shown) in sidewalls 14 of conveyor 10. An opening 15f may be formed in upper portion 15a and horizontal portion 15b of bracket 15 to provide clearance for installation of mounting block 36 and shaft support 22. The opening 15f is preferably formed corresponding to the location of the driven roller 16 of conveyor 10. Preferably, a pair of mounting apertures 15h are formed in horizontal portion 15b and adjacent to opening 15f for securing mounting block 36 to bracket 15, as discussed below. At least one additional aperture 15g is preferably formed through horizontal portion 15b of bracket 15 at one or both ends of mounting block 36 to facilitate electrical interconnection of motorized roller 16 to the control of conveyor 10. However, mounting apertures may be formed in one of the vertical portions 15a or 15c to receive mounting members extending through corresponding generally horizontal apertures through mounting block 36, without affecting the scope of the present invention. An electrical cable 40 may then extend from shaft portion 16b of roller 16 and may be inserted through passageway 15 g and connected to the control in a conventional manner. It is further envisioned that mounting block 36 may be mounted directly to a vertically oriented side channel or sidewall of the conveyor or to any other horizontally or vertically oriented mounting surface along the conveyor, without affecting the scope of the present invention.

As shown in FIGS. 2, 3, 4, and 5, mounting block 36 is preferably generally rectangular shaped with a raised portion 36a along its upper surface. A pair of mounting apertures 36b are formed at opposite ends of mounting block 36 for receiving a bolt 38 therethrough for securing mounting block 36 to horizontal portion 15b of bracket 15. Bolts 38 be threaded and extend through block 36. A correspondingly threaded nut 39 may then be secured to the threaded end to positively secure mounting block 36 to bracket 15. However, clearly mounting block 36 may be otherwise secured to brackets 15 or sidewalls 14, without affecting the scope of the present invention. Raised portion 36a may extend upwardly through the opening 15f formed in horizontal portion 15b, while mounting bolts 38 secure mounting block 36 to bracket 15. At least one generally cylindrical passageway 36c is formed through raised portion 36a and block 36 for receiving mounting extension 32b of shaft support 22 therethrough. Mounting block 36 may further include additional passageways 36d (FIG. 5) therethrough for receiving mounting extension 32b in order to facilitate easy repositioning of shaft support 22 along sidewalls 14 to allow for a skewed orientation of the roller. Preferably, mounting block 36 is formed from a plastic or urethane material. However, mounting block 36 may be formed of other materials without affecting the scope of the present invention.

When assembled, receiving block 30 receives shaft portion 16b of roller 16 through passageway 30a, such that rotation of shaft portion 16b is substantially precluded by receiving block 30. The material selected for receiving block 30 is preferably strong and durable to resist rounding off of the corners as motorized roller 16 is repeatedly cycled in either direction. Mounting extension 32b of yoke 32 may be inserted into passageway 36c and through mounting block 36. The length of mounting extension 32b and the height of mounting block 36 are correspondingly formed such that when yoke 32 is fully inserted through mounting block 36, mounting extension 32b extends through passageway 36c and block 36 and partially protrudes from a lower side 36e of block 36, as best seen in FIG. 2. Lock ring 32f extends through block 36 and restricts movement of mounting extension 32b along passageway 36c. Although longitudinal movement of mounting extension 32b is restrained by lock ring 32f, rotational movement of mounting extension 32b within passageway 36c is unrestricted, since mounting extension 32b preferably has a diameter at least slightly smaller than the diameter of passageway 36c. Yoke 32 may thus be free to pivot relative to mounting block 36 along axis 26 defined by mounting extension 32b, which is generally normal to the direction of conveyance of conveyor 10.

Alternately, however, mounting extension 32b of shaft support 22 may be otherwise secured to bracket 15 or sidewalls 14 of conveyor 10, without affecting the scope of the present invention. Clearly, the scope of the present invention includes mounting the shaft support of the present invention along the sidewalls of the conveyor using any known mounting methods. It is further envisioned that mounting extension 32b may be positively secured relative to sidewalls 14, such that shaft support 22 does not freely rotate about axis 26, but may be adjustably set to a preselected angle relative to sidewalls 14 corresponding to a desired skew angle of roller 16. For example, mounting extension 32b may be threaded along lower end 32g, as shown in FIG. 8. A nut (not shown) may be correspondingly threaded onto end 32g protruding through mounting block 36 or bracket 15 and tightened to positively secure yoke 32 relative to sidewalls 14. This may be a preferred design if the rollers of conveyor 10 are driven from underneath such that a vertical force may be applied to the rollers. Alternately, the yoke 32 may include a non-cylindrical mounting extension which is fixedly securable to a mounting member or opening along the side walls of the conveyor. The mounting member may be a rotatable member, such as a rotatable portion of mounting block 36, to allow rotation of the shaft support about axis 26.

When fully assembled and mounted to conveyor 10, shaft support 22 preferably provides for rotation about two axes 24 and 26, such that shaft support 22 may receive shaft portion 16b of roller 16 at various angles relative to sidewall 14 of conveyor 10, without requiring adjustment of the mounting bracketry or side bracket 15. Because receiving block 30 is freely pivotable about axis 24, receiving block 30 is pivotable to accommodate a change in vertical positioning of one or both ends of roller 16, as shown in FIG. 5. This facilitates easy installation and removal of the rollers, without requiring spring loading of the shaft portions of the rollers. In order to remove the rollers, one or both ends of the rollers may simply be lifted vertically upward, such that one or both of the mounting extensions 32b of shaft supports 22 are removed from passageway 36c or 36d in mounting block 36. As one end of the roller is raised above the other end, receiving block 30 at each end of the roller may pivot to accommodate the change in the angle of the roller between the two shaft supports 22. Installation of the rollers is likewise simplified, since the shaft portion 16b may be inserted through passageway 30a in receiving block 30 prior to mounting shaft support 22 onto sidewalls 14 or brackets 15. The roller and corresponding shaft supports are then moved into position and pressed into place along sidewalls 14 of conveyor 10. The two sides may be pushed downwardly into place simultaneously or one at a time, since receiving block 30 is free to rotate to accommodate any change in angle between the two shaft supports 22.

Figure 6:
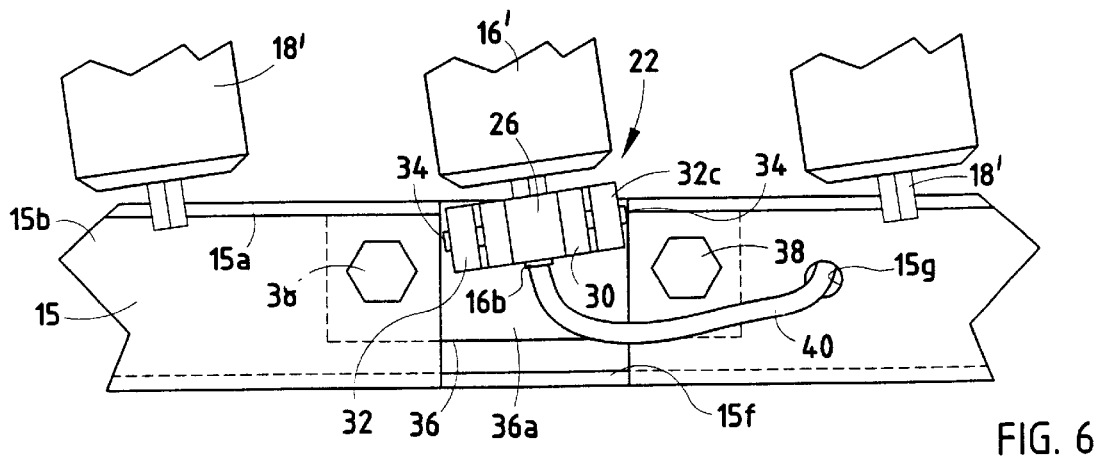
FIG. 6 is a top plan view of a section of a roller conveyor having skewed rollers mounted therealong.
Figure 7:
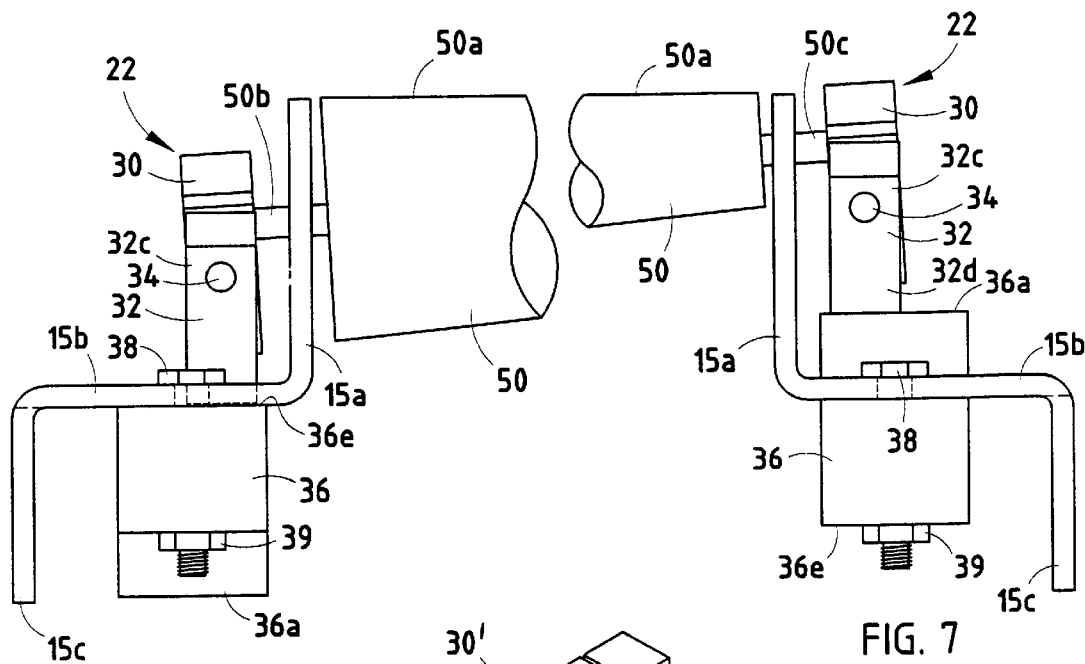
FIG. 7 is an end view of a conveyor section having a tapered roller mounted thereon.

Additionally, because shaft support 22 is pivotable about axis 26, skewed rollers 16' and 18' (FIG. 6), which are angled between brackets 15 or sidewalls 14, may be implemented without requiring a change in any of the bracketry associated with the shaft supports 22. As shown in FIG. 7, shaft support 22 pivots about axis 26 to the appropriate angle of the roller 16'. The shaft support 22 may be inserted through a different passageway 36d (FIG. 5) through mounting block 36 to change the location along one or both of the sidewalls 14. However, if the skew angle is greater than that allowed by moving shaft support 22 to a different opening in mounting block 36, mounting block 36 may be moved along bracket 15 or bracket 15 may be moved along one or both of the sidewalls 14. Other means for mounting the shaft support at different locations along the sidewalls may be implemented, without affecting the scope of the present invention.

Because receiving block 30 is freely rotatable about axis 24, this further facilitates implementation of a tapered roller 50 with minimal adaptation of the mounting bracketry associated therewith. As shown in FIG. 7, in order to maintain a level conveying surface 50a, a tapered roller 50 must be mounted at an angle, where one shaft end 50b is lower than the other end 50c, as is known in the art. In order to accommodate such a roller, one of the shaft supports 22 simply needs to be mounted at a different height from the other support, since both receiving blocks 30 will pivot accordingly to accommodate the change in angle of the shaft ends 50b and 50c. The change in height of the shaft supports 22 may be accomplished by inserting spacers (not shown) between the mounting block 36 and horizontal portion 15b of bracket 15. As shown in FIG. 7, the change in height may otherwise be accomplished by inverting the mounting block 36 at lower end 50b, such that the raised portion 36a extends downwardly, thereby providing a lower surface 36e for yoke 32 to rest upon when inserted therethrough. The other mounting block 36 at upper end 50c remains mounted to bracket 15 as discussed above, with raised portion 36a protruding upwardly through bracket 15. Clearly, however, other means of adjusting the height of one or both shaft supports 22 may be implemented without affecting the scope of the present invention.

Although shown as being generally hex-shaped, the shape of the shaft support may vary. As shown in FIG. 8, the shaft support 22' may be substantially square, having a squared receiving block 30', and a squared U-shaped yoke section 32'. Additionally, as discussed above, the mounting extension may be non-cylindrical or threaded at an end 32g' thereof for engaging a correspondingly threaded nut (not shown) in order to positively secure the shaft support to its mounting block or bracket. Although shown in FIGS. 2, 3, 4 and 5 as having slot 30e extending downwardly from passageway 30a, this is shown as a preferred location for a mold wall in applications where receiving block 30 is a plastic molded component. Clearly, however, passageway 30a' may be punched or otherwise formed through the receiving block, as shown in FIG. 8, without affecting the scope of the present invention.

Figure 9:
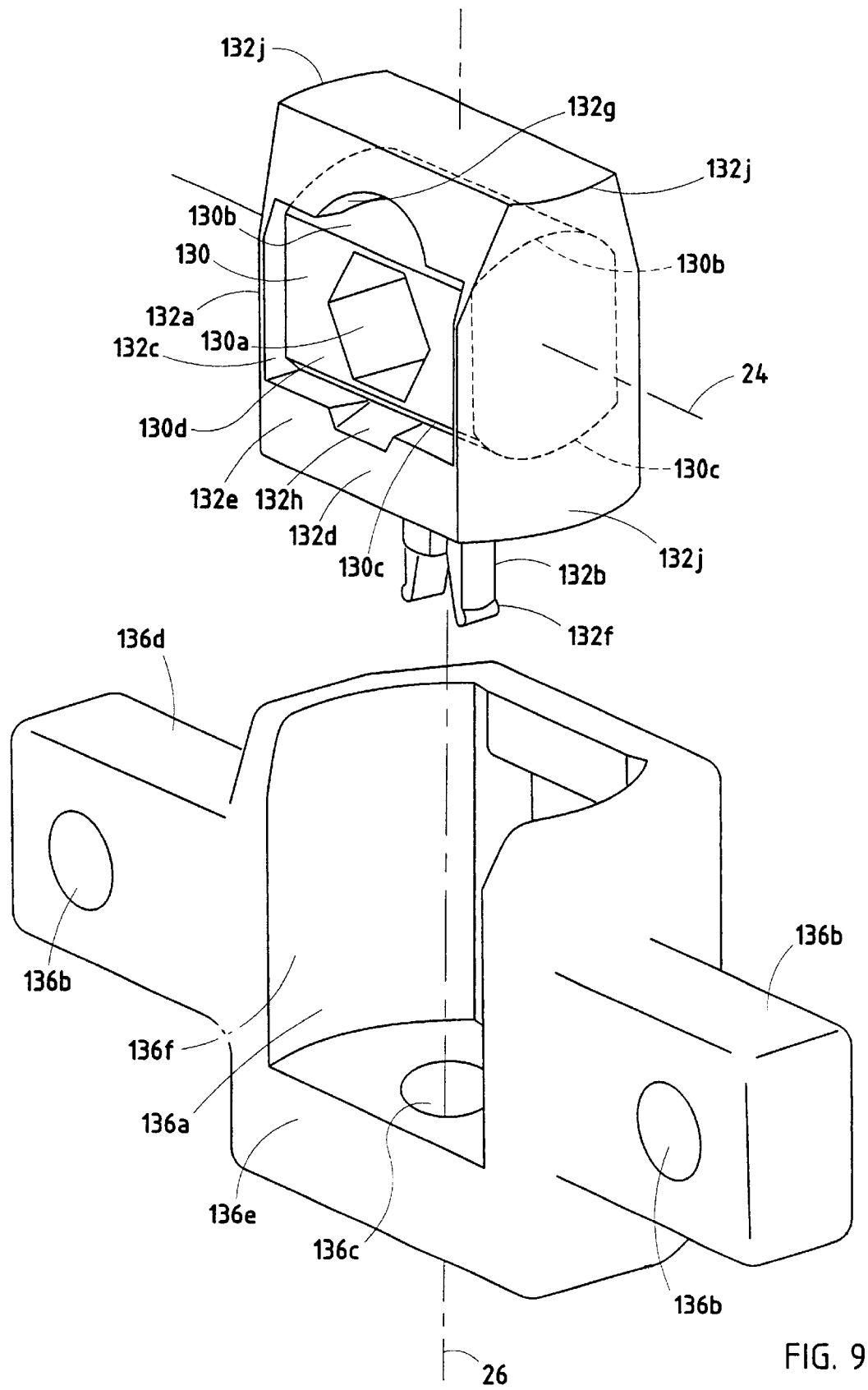
FIG. 9 is a partial exploded view of an alternate embodiment of a shaft support according to the present invention.

An alternate embodiment of the present invention is shown in FIG. 9, where a shaft support or receiver 122 preferably comprises a shaft receiving block 130, a yoke or pivotable mounting member 132, and a fixed mounting member or mounting block 136. Similar to mounting block 36 of shaft support 22, discussed above, mounting portion 136 may be fixedly secured along a mounting bracket or sidewall of a conveyor (not shown). Shaft support 122 is preferably pivotable about two axes, such that it may pivot about an axis 24, which extends generally parallel to the direction of conveyance of the conveyor, and further about an axis 26, which is generally perpendicular or normal to the direction of the conveyance of the conveyor. Preferably, mounting block 136, receiving portion 130, and yoke 132 comprise one or more engineering plastics, such as acetal, or nylon, which are known in the art and are commercially available from known sources. However, the components of shaft support 122 may otherwise be formed from other plastics or materials, such as stainless steel or the like, without affecting the scope of the present invention.

Receiving block 130 is generally cylindrical or barrel-shaped, such that receiving block 130 has an upper curved surface 130b and a lower curved surface 130c. A passageway 130a is formed through receiving block 130 to receive a shaft portion of a conveyor roller, similar to passageway 30a of shaft receiver 22, discussed above. Passageway 130a may be hexagonal shaped, or may be other shapes to receive a correspondingly shaped shaft portion of a conveyor roller. Preferably, opposite faces or sides 130d of receiving block 130 are substantially flat, to provide a surface for engagement of the shafts of the conveyor rollers with the passageway 130a, and to facilitate assembly of shaft support 122, as discussed below.

Yoke or pivotable mounting portion 132 comprises a housing portion 132a, which pivotally receives shaft receiving block 130 therein, and may further include a mounting extension 132b, which extends downwardly from a lower region or base 132d of yoke 132. Preferably, yoke 132 is symmetrically formed, such that yoke 132 may be pivotally mounted to block 136 with either face 132e facing outwardly from block 136, as discussed below. Housing portion 132a is generally hollow and has an opening 132c at each face 132e of yoke 132. A cavity formed within housing portion 132a is generally barrel-shaped, and is preferably correspondingly formed with the barrel-shaped receiving block 130. Housing portion 132a of yoke 132 may further comprise a pair of curved opposite sidewalls 132j, such that yoke 132 is also generally barrel-shaped.

Each face 132e of housing portion 132a may further include a rounded notch or opening 132g at an upper end of openings 132c, to provide for conveyor roller shoulder clearance when the roller shaft and shaft receiving block 130 are pivoted upwardly relative to yoke 132. Yoke 132 may further include a notch or chamfer 132h on each side thereof at a lower portion of openings 132c to provide clearance for a shaft end of the roller as the roller is pivoted upwardly relative to yoke 132, such that its opposite shaft end extending through receiving block 130 pivots downwardly toward a lower region or base of housing portion 132a. Chamfer 132h is shown in FIG. 9 as also being on the forward face 132e of yoke 132 because chamfer 132h is preferably formed on both sides of yoke 132, such that yoke 132 may be reversibly mounted within mounting block 136.

Mounting extension 132b of yoke 132 is preferably generally cylindrically formed, and preferably includes a locking portion 132f at a lower end thereof. Preferably, mounting extension 132b comprises a pair of mounting arms, which are biased outwardly from one another and include a ridge at a lower end thereof. This allows the arms to be pressed toward one another as mounting extension 132b is inserted through a correspondingly formed opening 136c in mounting block 136, and then to expand outwardly from one another as the ridges protrude through a lower surface of mounting block 136. The mounting extensions 132b may otherwise be insertable through one or more openings in the sidewalls, side channels or the like of the conveyor to pivotally or fixedly mount yoke 132 to the conveyor, without affecting the scope of the present invention.

Mounting block 136 may be fixedly securable to the sidewalls or brackets of a conveyor via a pair of mounting arms 136d. Each mounting arm 136d includes a passageway or opening 136b extending therethrough for receiving a mounting member or bolt (not shown) for insertion therethrough and further insertion into the mounting bracket, sidewall, or side channel of the conveyor, similar to mounting block 36 discussed above. Although shown with mounting arms 136d having generally horizontal mounting passageways 136b, it is further envisioned that mounting arms 136d may be formed in varying locations around mounting block 136, and may further include passageways 136b extending generally vertically or in any other direction to receive a mounting member or bolt for attaching mounting block 136 to a sidewall, bracket, or any other mounting surface of the conveyor, without affecting the scope of the present invention. Alternately, mounting block 136 may be otherwise secured to the conveyor via other known clamping or mounting means, such that the mounting block 136 may be fixedly secured along a sidewall or side channel of a conveyor.

Mounting block 136 may further include a receiving cavity 136a for receiving yoke 132 therein. Receiving cavity 136a extends upwardly from a base region 136e of mounting block 136 and is also generally barrel-shaped and defined by a pair of generally curved opposite side walls 136f. Opening or passageway 136c is preferably provided through base 136e for insertion of mounting extension 132b therethrough as yoke 132 is inserted into cavity 136a of mounting block 136.

As shown in FIG. 9, receiving block 130 fits within cavity 132a of yoke 132. Cavity 132a is formed to include curved upper and lower portions, which correspond in curvature to the upper and lower curved edges 130b and 130c of receiving block 130. Receiving block 130 thus is pivotable about axis 24 relative to yoke 132 by upper and lower surfaces 130b and 130c slidably engaging the upper and lower walls of cavity 132a. Because receiving block 130 is formed with generally flat opposite sides 130d, receiving block 130 may be pivoted such that one of the curved edges 130b or 130c is inserted through a opening 132c of cavity 132a. Receiving block 130 then may be rotated into its operational position such that the curved edges 130b and 130c engage the corresponding curved surfaces of cavity 132a, as shown in FIG. 9. The curved walls of the cavity engage the curved surfaces 130b and 130c of receiving block 130, and substantially preclude non-rotational movement therebetween, such that receiving block 130 is substantially precluded from being unintentionally removed from yoke 132. Although shown as being generally smooth surfaces, curved surfaces 130b and 130c and/or the correspondingly formed surfaces of cavity 132a may include ridges or fingers (not shown) extending therealong to guide receiving block 130 within yoke 132 and to further facilitate easier rotational movement of receiving block 130 relative to yoke 132.

Yoke 132 is preferably pivotally inserted within cavity 136a of mounting block 136. Curved sidewalls 132j of yoke 132 then slidably engage the correspondingly curved sidewalls 136f of cavity 136a, such that yoke 132 may pivot about axis 26 relative to mounting block 136. Preferably, mounting extension 132b is insertable through opening or passageway 136c in base 136e of mounting block 136 until retaining portions 132f protrude through passageway 136c and engage the lower surface of mounting block 136, in order to substantially preclude unintentional removal of yoke 132 from mounting block 136. By including mounting extension 132b on yoke 132, mounting extension 132b may further function to reduce binding of yoke 132 within mounting block 136 by pivotally anchoring a center pivot axis of yoke 132.

Accordingly, yoke 132 may be pivotally mounted within mounting block 136, since curved walls 132j slidably engage correspondingly curved walls 136f of mounting block 136 as yoke 132 pivots relative to mounting block 136 about pivot axis 26. Mounting block 136 may then be fixedly secured to a sidewall, side channel or bracket or the like along a conveyor, such that shaft support 122 may pivotally support a shaft end of a conveyor roller, similar to shaft support 22 discussed above. Mounting block 136 may be mounted along the conveyor to support skewed rollers, or may be mounted at differing heights from a corresponding mounting block on another side of the conveyor, in order to support a tapered roller.

Figure 10:
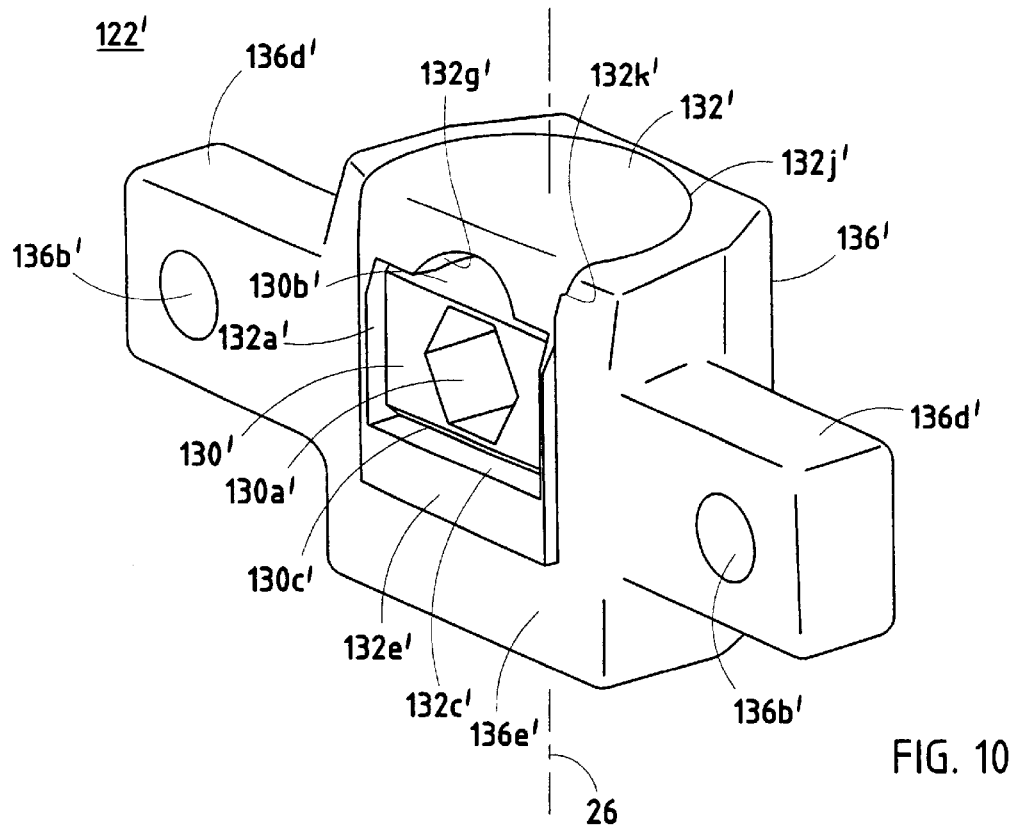
FIG. 10 is a perspective view of another alternate embodiment of a shaft support in accordance with the present invention.
Figure 11:
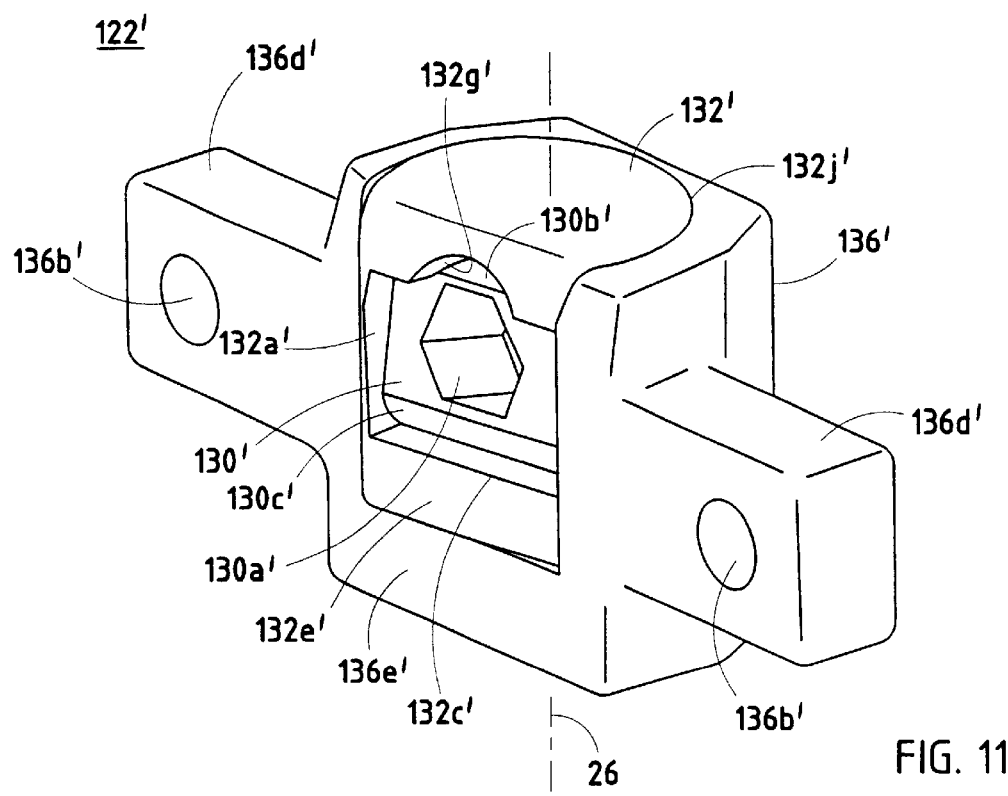
FIG. 11 is the same perspective view of FIG. 10, showing the receiving block pivoted relative to the yoke, which is pivoted relative to the mounting block.

Referring to FIGS. 10 and 11, an assembled shaft support 122' is shown which comprises a receiving block 130', a pivotable mounting portion or yoke 132', and a mounting block 136'. Shaft support 122' is substantially similar to shaft support 122, discussed above. However, yoke 132' is generally cylindrical or barrel-shaped along both sides and one face, such that yoke 132' has a substantially continuous curved sidewall 132j', and is thus not reversibly mounted within mounting block 136'. Receiving block 130' is generally the same as receiving block 130, and includes a passageway 130a' therethrough, which may be formed to receive a correspondingly shaped conveyor roller shaft, such as hexagonal shaft or the like. Receiving block 130' further includes upper and lower curved surfaces 130b' and 130c', respectively, for slidable engagement with correspondingly formed curved surfaces within a cavity 132a' of yoke 132'.

Yoke 132' is generally cylindrical shaped with curved sidewall 132j' and a substantially flat face 132e'. An opening 132c' is formed in face 132e', for insertion of receiving block 130' therethrough and into the receiving cavity 132a' within yoke 132', similar to yoke 132 and receiving block 130. Preferably, a roller shoulder clearance notch or cut-a-way 132g' is formed in an upper portion of yoke 132' for clearance of a roller shoulder when the roller is pivoted upwardly with respect to yoke 132'. Additionally, a chamfer or notch (not shown) may be formed at an end of cavity 132a' of yoke 132' which is opposite face 132e', for clearance of the shaft end of the roller which extends through receiving block 130' when receiving block and roller are pivoted upwardly with respect to yoke 132'. The chamfer is not also formed in the forward face 132e', since yoke 132' is not reversibly mounted within mounting block 136'.

Mounting block 136' is also substantially similar to mounting block 136, discussed above. However, the receiving cavity of mounting block 136' is generally cylindrical to receive and engage the curved sidewall 132j' of yoke 132'. Because sidewall 132j' substantially continuously engages the wall of receiving block 136', yoke 132' and mounting block 136' cooperate to substantially preclude dust, dirt or the like from settling and accumulating on or between yoke 132' and mounting block 136'. A passageway (not shown) through a lower region 136e' of mounting block 136' may further receive a mounting extension (not shown) of yoke 132' to pivotally secure yoke 132' to mounting block 136' and to substantially preclude binding of yoke 132' as it rotates about axis 26 relative to mounting block 136'. Mounting block 136' may be fixedly secured to a side channel, a sidewall, a mounting bracket, or any other mounting surface or structure along a conveyor. Mounting block 136' may be secured via a pair of horizontally oriented fasteners or the like extending through passageways 136b' and mounting arms 136d', or may be secured via vertically oriented fasteners and passageways, or may be secured via any other known mounting means, without affecting the scope of the present invention.

An upper region 132k' of sidewall 132j' of yoke 132' may be formed at a slightly larger radius than the main body or lower region of yoke 132', while an upper portion of cavity 136a' of mounting block 136' is correspondingly formed to receive the larger diameter portion of yoke 132' therein. The larger diameter upper portion 132k' engages an upper edge of the smaller diameter cavity of the mounting block 136' when the yoke 132' is placed within mounting block 136'. This further functions as a dust cover or cap to reduce or substantially preclude dust, dirt or the like from accumulating between sidewall 132j' and the correspondingly formed walls of mounting block 136', thereby facilitating smooth and easy rotation of yoke 132' relative to mounting block 136'. It is further envisioned that a separate cap may be provided on yoke 132' or mounting block 136' to prevent accumulation of dust or the like.

As shown in FIG. 11, receiving block 130' may pivot relative to yoke 132', to allow the shaft of the roller to pivot upwardly or downwardly relative to yoke 132' and mounting block 136'. Alternately, or in addition thereto, yoke 132' may also pivot about axis 26 relative to mounting block 136', to easily facilitate mounting of skewed rollers along the conveyor, without requiring new mounting structures or the like. Similar to shaft support 122, discussed above, shaft support 122' preferably comprises engineering plastics, such as acetal or nylon or the like, which may be molded into each of the components discussed above. However, other plastics or materials may be used without affecting the scope of the present invention.

Therefore, the present invention provides a shaft support which non-rotatably secures the shaft portions of a driven or non-driven roller, while being pivotable to accommodate skewed rollers and/or tapered rollers. Because the shaft support is pivotable about a generally horizontal axis, the shaft support further facilitates easy installation and/or removal of the rollers since it is pivotable to account for a change in the vertical orientation of one end of the roller relative to the other. This further facilitates easier replacement of O-rings on the conveyor rollers, since one end of the roller may be accessed without having to remove the entire roller from the conveyor. While the shaft support may be implemented with a conventional roller having a spring loaded shaft, rollers may be implemented with the shaft support which do not include spring loaded shafts. This allows for a lower cost roller, which is easier to install and remove on the roller conveyor. It is further envisioned that the rollers and shaft supports may be marketed as a single unit which is less expensive to manufacture over the prior art and may be easily installed in a conventional roller conveyor.

Furthermore, the shaft support may be implemented on a conventional pre-punched sidewall, side channel or frame or bracket of the conveyor, with minimal adaptation required. The shaft support may receive the shaft end of a motorized roller through a correspondingly shaped passageway, and substantially preclude relative rotation therebetween, while resisting wear and corrosion and the like of either the shaft portion or the shaft support. Although the shaft support is preferably implemented with a driven or motorized roller, clearly the scope of the present invention includes implementing the shaft support with non-driven or slave rollers as well.

An additional benefit of the present invention is that the design of the shaft support is simple, such that the supports can be maintained or replaced without requiring any tools. Likewise, the rollers and shaft supports may be installed and removed from the conveyor without any tools.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A roller shaft support for supporting a shaft end of a self-driven conveyor roller at a conveyor having a plurality of conveyor rollers extending laterally across the conveyor, the conveyor having opposite sidewalls which extend generally along a direction of conveyance, said shaft support being interconnectable to the conveyor such that said shaft support is pivotable about a first axis which is generally parallel to the direction of conveyance, wherein said shaft support is pivotable about a second axis which is generally normal to the direction of conveyance.

2. The roller shaft support of claim 1, wherein said self-driven conveyor roller is motorized, said shaft support limiting rotation of the shaft.

3. The roller shaft support of claim 1, wherein said first axis is generally horizontal and said second axis is generally vertical.

4. The roller shaft support of claim 1, wherein said shaft support comprises a mounting yoke and a receiving block, said mounting yoke being interconnectable to the conveyor and said receiving block being pivotally mounted to said mounting yoke such that said receiving block is pivotable relative to said mounting yoke about said first axis.

5. The roller shaft support of claim 1, wherein said shaft support is adjustably interconnectable to the conveyor to adjust the level of said shaft support relative to the sidewall of the conveyor.

6. The roller shaft support of claim 1, wherein said shaft support comprises a mounting yoke and a receiving block, said mounting yoke being pivotally interconnectable to the conveyor and being pivotable about said second axis, said receiving block being pivotally mounted to said mounting yoke and being pivotable relative to said mounting yoke about said first axis.

7. The roller shaft support of claim 6, wherein said yoke comprises steel and said receiving block comprises plastic.

8. The roller shaft support of claim 6, wherein said mounting yoke has a pair of upwardly extending arms defining a U-shaped receiving portion, said receiving block being pivotally interconnected between said pair of upwardly extending arms.

9. The roller shaft support of claim 8, wherein said receiving block is pivotally interconnected between said pair of upwardly extending arms by at least one pivot pin extending at least partially through at least one of said upwardly extending arms and said receiving block.

10. The roller shaft support of claim 6, wherein said receiving block is generally barrel-shaped and rotatably positionable within a correspondingly formed cavity within said mounting yoke.

11. The roller shaft support of claim 10, wherein said mounting yoke is pivotally mountable to a mounting block which is interconnectable to the conveyor.

12. The roller shaft support of claim 11, wherein said mounting yoke is generally barrel-shaped and is pivotally insertable within a correspondingly formed cavity in said mounting block.

13. The roller shaft support of claim 12, wherein said mounting block, said mounting yoke, and said receiving block comprise a plastic material.

14. The roller shaft support of claim 6, wherein said mounting yoke is pivotally mountable to a mounting block which is interconnectable to the conveyor.

15. The roller shaft support of claim 14, wherein said mounting yoke includes a mounting section which is pivotally insertable into said mounting block.

16. The roller shaft support of claim 15, wherein said mounting block includes at least two openings for receiving said mounting section of said mounting yoke, said shaft support being adjustably positionable along said mounting block to receive the roller shaft at one of at least two positions along said mounting block.

17. The roller shaft support of claim 15, wherein said mounting block is adjustably interconnectable to the conveyor to adjust the level of said shaft support relative to the sidewall of the conveyor.

18. The roller shaft support of claim 17, wherein the conveyor roller is a tapered roller and the level of said shaft support is adjustable to provide a level conveying surface, said receiving block being pivotable about said first axis to receive the shaft of the tapered roller at an appropriate angle.

19. A roller conveyor for conveying product, said roller conveyor comprising:

a pair of opposite sidewalls;

a plurality of rollers, at least one of said rollers comprising a generally cylindrical roller portion defining an article contact surface and at least one shaft portion, said at least one shaft portion extending outwardly from ends of said roller portion and defining an axis of rotation of said roller portion extending in a substantially straight line along said roller portion, said roller portion being rotatably interconnected with said at least one shaft portion; and at least one shaft support for pivotally mounting said at least one shaft portion to at least one of the sidewalls of the conveyor, said shaft support limiting rotation of said at least one shaft portion relative to said shaft support, said shaft support being pivotable relative to the sidewalls about a first axis which is generally parallel to a direction of conveyance of the conveyor, wherein said shaft support is pivotally interconnectable with the conveyor, said shaft support being pivotable about a second axis which is generally normal to the direction of conveyance.

20. The roller conveyor of claim 19, wherein said rollers are mounted askew to the direction of conveyance, said shaft support at each end of said rollers being mountable along the sidewalls such that said shaft supports are spaced along the sidewalls and pivotable to receive said shaft portion at an appropriate angle.

21. The roller conveyor of claim 19, wherein said rollers are tapered rollers, said shaft support being pivotable about said first axis to receive said shaft portion at a first appropriate angle.

22. The roller conveyor of claim 19, wherein at least one of said plurality of rollers is a driven roller to convey product along said plurality of rollers in the direction of conveyance.

23. The roller conveyor of claim 22, wherein said driven roller is a motorized roller comprising a motor for rotating said roller portion relative to said shaft portions.

24. The roller conveyor of claim 19, wherein said shaft support comprises a mounting yoke and a receiving block, said mounting yoke being mountable to the conveyor, said receiving block being pivotally mounted to said mounting yoke and being pivotable about said first axis relative to said mounting yoke.

25. The roller conveyor of claim 24, wherein said mounting yoke is pivotally interconnectable to said conveyor, said mounting yoke being pivotable about said second axis which is generally normal to the direction of conveyance.

26. The roller conveyor of claim 24, wherein said mounting yoke has a pair of upwardly extending arms defining a U-shaped receiving portion, said receiving block being pivotally interconnected between said pair of upwardly extending arms.

27. The roller conveyor of claim 26, wherein said receiving block is pivotally interconnected between said pair of upwardly extending arms by at least one pivot pin extending at least partially through at least one of said upwardly extending arms and said receiving block.

28. The roller conveyor of claim 24, wherein said receiving block is generally barrel-shaped and rotatably insertable within a correspondingly formed cavity within said mounting yoke.

29. The roller conveyor of claim 28, wherein said mounting yoke is generally barrel-shaped and rotatably insertable within a correspondingly formed cavity within a mounting block, said mounting block being securable to the conveyor, said mounting yoke being pivotable about said second axis which is generally normal to the direction of conveyance.

30. The roller conveyor of claim 24, wherein said mounting yoke is pivotally mountable to a mounting block which is secured to the conveyor, said yoke being pivotable about said second axis which is generally normal to the direction of conveyance.

31. The roller conveyor of claim 30, wherein said mounting yoke includes a mounting section which is pivotally insertable into said mounting block.

32. The roller conveyor of claim 31, wherein said mounting section includes a locking member at an end thereof to retain said mounting section in said mounting block.

33. A roller shaft support for supporting an end of a shaft of a conveyor roller having an axis of rotation extending in a substantially straight line along the conveyor roller, said roller shaft support comprising:

a receiving body which is engagable with the end of the shaft of the conveyor roller; and a yoke defining a cavity, said cavity being correspondingly formed with said receiving body for pivotally receiving said receiving body therein, said yoke being mountable at a side portion of the conveyor, said receiving body being pivotable relative to the conveyor about a first axis extending generally along a direction of conveyance of the conveyor, wherein said yoke is pivotally mountable to the conveyor, said yoke being pivotable about a second axis extending generally normal to the direction of conveyance.

34. The roller shaft support of claim 33, wherein said receiving body generally barrel-shaped and said yoke defines a correspondingly formed generally barrel-shaped cavity.

35. The roller shaft support of claim 33, wherein said roller shaft support is mountable along a side portion of a conveyor.

36. The roller shaft support of claim 33, wherein said receiving body and said yoke comprise a plastic.

37. The roller shaft support of claim 33, wherein said yoke is pivotally mountable to a mounting block, said yoke being generally barrel-shaped, said mounting block defining a generally barrel-shaped cavity therein, such that said yoke is pivotally positionable within said barrel-shaped cavity of said mounting block and pivotable about said second axis relative to said mounting block, said mounting block being fixedly securable to the conveyor.

38. The roller shaft support of claim 37, wherein said yoke further includes a mounting extension, which pivotally secures said yoke to said mounting block within said barrel-shaped cavity.

39. The roller shaft support of claim 37, wherein said yoke is reversibly mountable within said barrel-shaped cavity of said mounting block.

40. The roller shaft support of claim 37, wherein said yoke comprises a generally cylindrical sidewall which engages a correspondingly formed generally cylindrical cavity defined by said mounting block.

41. A method of installing an elongated roller to a conveyor having first and second side members comprising:

providing a shaft support at the first side member of the conveyor, said shaft support being pivotable relative to the first side member about a first axis generally parallel to a direction of conveyance of the conveyor;

inserting a first end of the elongated roller into a receiving portion of said shaft support;

drivingly joining the roller to at least one other roller by a drive transmitting device;

pivoting said shaft support about said first axis to move a second end of the roller toward the second side member; and pivoting said shaft support about a second axis generally normal to the direction of conveyance such that the roller is skewed with respect to the side members.

42. The method of claim 41 including replacing said drive transmitting device.

43. The method of claim 41 including providing a second shaft support at said second end of the roller for supporting the second end of the roller, said second shaft support being pivotable relative to the side members about an axis generally parallel to the direction of conveyance of the conveyor.

44. The method of claim 41, wherein pivoting said shaft support includes pivoting a shaft receiving portion of said shaft support relative to a mounting portion of said shaft support about said first axis.

45. The method of claim 44 further including pivoting said shaft receiving portion of said shaft support about said second axis generally normal to the direction of conveyance such that the roller is skewed with respect to the side members.

46. The method of claim 45, wherein providing said shaft support at the first side member includes pivotally mounting said mounting portion of said shaft support at the first side member.

47. The method of claim 46, wherein pivotally mounting said mounting portion includes inserting said mounting portion into a mounting member positioned at the first side member.

48. The method of claim 47, wherein pivotally mounting said mounting portion includes adjusting said mounting member relative to the first side member to adjust a height of the first end of the roller when said mounting portion is inserted into said mounting member.

49. The method of claim 41, wherein the step of drivingly joining the roller includes positioning said drive transmitting device closer to the second end of the roller than the first end.

50. The method of claim 49, wherein the elongated roller comprises a self-driven roller.

51. The method of claim 50, wherein the self-driving roller comprises a powered roller.

52. A roller shaft support for supporting a shaft end of a conveyor roller at a side portion of a conveyor, said roller shaft support comprising:
   first mounting means for mounting said roller shaft support at the side portion of the conveyor, said first mounting means being configured for mounting to the side portion of the conveyor;
   a yoke having a pair of spaced apart arms and second mounting means for pivotally mounting said yoke at said first mounting means at the side portion of the conveyor; and
   a body pivotably mounted between said arms, said body being engagable with the shaft end of the conveyor roller.

53. The roller shaft support of claim 52, wherein said second mounting means is pivotable relative to said first mounting means about a second axis extending generally normal to a direction of conveyance of the conveyor.

54. The roller shaft support of claim 52, wherein said body of said roller shaft support is engagable with a shaft end of a self-driven roller.

55. The roller shaft support of claim 52, wherein said body is pivotable about a first axis extending along a direction of conveyance of the conveyor.

56. The roller shaft support of claim 55, wherein said second mounting means is pivotable relative to said first mounting means about a second axis extending generally normal to the direction of conveyance.

57. A conveyor comprising:
   at least two opposite side members extending generally along a direction of conveyance;
   a plurality of conveyor rollers extending generally laterally across said conveyor; and
   a shaft support configured to support an end of at least one of said plurality of conveyor rollers, said shaft support being pivotable about at least first and second generally orthogonal axes at the end of said at least one conveyor roller.

58. The conveyor of claim 57, wherein said first axis is generally horizontal and said second axis is generally vertical.

59. The conveyor of claim 57, wherein at least some of said conveyor rollers are drivably connected via at least one drive transmitting device.

60. The conveyor of claim 57, wherein said second axis is generally normal to the direction of conveyance.

61. The conveyor of claim 57 further including a second shaft support configured to support an opposite end of said conveyor roller, said second shaft support being pivotable about at least first and second generally orthogonal axes at the opposite end of said at least one of said plurality of conveyor rollers.

62. The conveyor of claim 57, wherein said first axis is generally parallel to the direction of conveyance.

63. The conveyor of claim 62, wherein said second axis is generally normal to the direction of conveyance.

64. The conveyor of claim 59, wherein at least one of said plurality of conveyor rollers comprises a self-driven roller.

65. The conveyor of claim 65, wherein said self-driven roller is joined with at least one other roller by said at least one drive transmitting device.

66. The conveyor of claim 65, wherein said self-driven roller comprises a powered roller.

67. A roller shaft support for supporting a shaft of a conveyor roller extending laterally across a conveyor having opposite sidewalls which extend generally along a direction of conveyance, said shaft support being interconnectable to the conveyor such that said shaft support is pivotable about a first axis which is generally parallel to the direction of conveyance, wherein said shaft support is adjustably interconnectable to the conveyor to adjust the level of said shaft support relative to the sidewalls of the conveyor, the conveyor roller being a tapered roller and the level of said shaft support being adjustable to provide a level conveying surface, said shaft support being pivotable about said first axis to receive the shaft of the tapered roller at an appropriate angle.

68. A roller conveyor for conveying product, said roller conveyor comprising:
   a pair of opposite sidewalls;
   a plurality of rollers, said rollers comprising a generally cylindrical roller portion and a shaft portion extending longitudinally outwardly from each end of said roller portion, said roller portion being rotatably interconnected with said sidewalls, said rollers being tapered rollers; and
   at least one shaft support for pivotally mounting at least one of said shaft portions to at least one of the sidewalls of the conveyor, said shaft support limiting rotation of said shaft portion relative to said shaft support, said shaft support being pivotable relative to the sidewalls about a first axis which is generally parallel to a direction of conveyance of the conveyor, said shaft support being pivotal about said first axis to receive said shaft portion at a first appropriate angle, wherein said shaft support is mountable to a mounting block which is securable to the conveyor, said mounting block being invertable to adjust a height of said shaft support to accommodate differing heights of said shaft portions at opposite ends of said tapered rollers.

69. A roller conveyor for conveying product, said roller conveyor comprising:
   a pair of opposite sidewalls;
   a plurality of rollers, said rollers comprising a generally cylindrical roller portion and a shaft portion extending longitudinally outwardly from each end of said roller portion, said roller portion being rotatably interconnected with said sidewalls, said rollers being tapered rollers; and at least one shaft support for pivotally mounting at least one of said shaft portions to at least one of the sidewalls of the conveyor, said shaft support limiting rotation of said shaft portion relative to said shaft support, said shaft support being pivotable relative to the sidewalls about a first axis which is generally parallel to a direction of conveyance of the conveyor, said shaft support being pivotable about said first axis to receive said shaft portion at a first appropriate angle, wherein said rollers are mounted askew to the direction of conveyance, said shaft support at each end of said roller being mountable to the conveyor such that said shaft supports are spaced along the sidewalls, said shaft supports being pivotally interconnected with the conveyor and pivotable about a second axis which is generally normal to the direction of conveyance, said shaft supports being pivotable to receive said shaft portion at a second appropriate angle.

70. A method of installing an elongated roller to a conveyor having first and second side members comprising:

providing a shaft support at the first side member of the conveyor, said shaft support being pivotable relative to the first side member about a first axis generally parallel to a direction of conveyance of the conveyor;

inserting a first end of the elongated roller into a receiving portion of said shaft support;

drivingly joining the roller to at least one other roller by a drive transmitting device;

pivoting said shaft support about said first axis to move a second end of the roller toward the second side member; and replacing said drive transmitting device, wherein replacing said drive transmitting device comprises;

pivoting said shaft support about said first axis to move the second end of the roller away from the second side member;

removing said drive transmitting device from the roller;

installing a new drive transmitting device on the roller; and pivoting said shaft support about said first axis to move the second end of the roller back toward the second side member.

71. A method of installing an elongated roller to a conveyor having first and second side members comprising:

providing a shaft support at the first side member of the conveyor, said shaft support being pivotable relative to the first side member about a first axis generally parallel to a direction of conveyance of the conveyor;

inserting a first end of the elongated roller into a receiving portion of said shaft support;

drivingly joining the roller to at least one other roller by a drive transmitting device;

pivoting said shaft support about said first axis to move a second end of the roller toward the second side member; and providing a second shaft support at said second end of the roller for supporting the second end of the roller, said second shaft support being pivotable relative to the side members about an axis generally parallel to the direction of conveyance of the conveyor, wherein after pivoting said shaft support, said method includes joining said second shaft support with the second side member.

72. The method of claim 71, wherein joining said second shaft support with the second side member includes vertically moving said second shaft support relative to the second said member for vertical sliding engagement of said second shaft support to the second side member.

* * * * *

UNITED STATES PATENT AND TRADEMARK OFFICE
CERTIFICATE OF CORRECTION

PATENT NO. : 6,367,617 B1
DATED : April 9, 2002
INVENTOR(S) : Ricardo N. Schiesser and Curtis E. LeMay It is certified that error appears in the above-identified patent and that said Letters Patent is hereby corrected as shown below:

Column 17,
Line 27, "self-driving" should be -- self-driven --
Line 40, "pivotably" should be -- pivotally --

Column 18,
Lines 21 and 24, "Claim 65" should be -- Claim 64 --
Line 56, "pivotal" should be -- pivotable --

Column 20,
Line 34, "said" should be -- side -- in the first occurrence

Signed and Sealed this

Eighth Day of June, 2004

JON W. DUDAS
*Acting Director of the United States Patent and Trademark Office*